NEIL D. BEASLEY
GERALD E. WHITEHURST
JACOB S. SALETZKI
FRED R. LOFTHOUSE
ROBERT L. WEBER
INVENTORS

ATTORNEYS

United States Patent Office 3,452,610
Patented July 1, 1969

3,452,610
INTERCHANGEABLE DUAL GEAR TRAIN ASSEMBLIES
Neil D. Beasley, Chillicothe, Gerald E. Whitehurst, East Peoria, Jacob S. Saletzki, Peoria, Fred R. Lofthouse, Pekin, and Robert L. Weber, Lacon, Ill., assignors, by mesne assignments, to the United States of America as represented by the Secretary of the Army
Filed Jan. 17, 1968, Ser. No. 698,461
Int. Cl. F16h 37/00, 37/06; F02b 75/06
U.S. Cl. 74—15.2                          9 Claims

ABSTRACT OF THE DISCLOSURE

A timing gear train assembly located on both the front and rear portions of the engine which utilizes cage and roller bearings in the idler gears and which has power-take-off gears positioned at each corner of the engine. The power-take-off gears and pads are so designed that any given accessory can be mounted on any of the four power-take-off pads and rotate at the same speed and in the same direction.

---

This invention relates to timing gear trains. In any combustion engine, provisions are made for ascertaining that fuel is injected into the combustion chamber at the proper time, that combustion of the fuel occurs at the right moment, which is generally considered to be just before the piston reaches top dead center in its compression stroke, and that exhaust ports open at the proper time to vent the burned gas and mixture. It is common to employ a timing gear train to effectuate this purpose. It has also been known to utilize these gear trains to drive engine accessories. Gear trains of this type have several disadvantages. Among these are the limited number and improper spacing of stations where power may be taken from the gear train to drive accessories which are mounted on the engine and the improper mating of the gears which results in much engine noise and unnecessary wear. Moreover, previous engines have mounted the timing gear train on only one end of an engine, thereby limiting its versatility. These previous engines have also been of limited utility because, as a general rule, they can only produce primary rotational force in one direction when viewed at the rear of the engine. Although reverse rotation of an engine has been previously obtained by turning the fuel pump and intake and exhaust camshafts end for end, this was accomplished by actually operating the engine in the opposite direction.

The present invention provides for a timing gear train which is mounted on both the front and rear ends of the engine in the bank off-set to reduce engine length. The gear train operates smoothly and efficiently through the use of cage and roller bearings in the idler gears. The gears are so arranged that a power-take-off gear is available at each corner of the engine. An accessory will rotate in the same direction regardless of which power-take-off pad it is mounted to. Rotational force in an opposite direction for a specific installation is accomplished by turning the engine end for end and interchanging the flywheel and the damper. Full power can be taken from either end of the engine.

One of the objects of the present invention, therefore, is the elimination of the aforementioned disadvantages.

It is another object of the present invention to provide a gear train which permits power to be taken off at all four corners of the engine while reducing backlash and clearance between the gears.

It is yet another object of the present invention to provide a dual timing gear train which has power-take-off pads evenly distributed about the engine with output gears which all turn any given accessory at the same speed and in the same direction.

It is still another object of the present invention to provide a timing gear train assembly which has individually interchangeable timing gear trains mounted on the front and rear of the engine with power-take-off positions evenly distributed about the engine.

It is still a further object of the present invention to obtain reverse rotational power from the engine without reversing the rotation of the engine.

Other objects and advantages of the present invention will be made obvious to those skilled in the art by the following description when considered in relation to the accompanying drawing of which:

Figure 1:
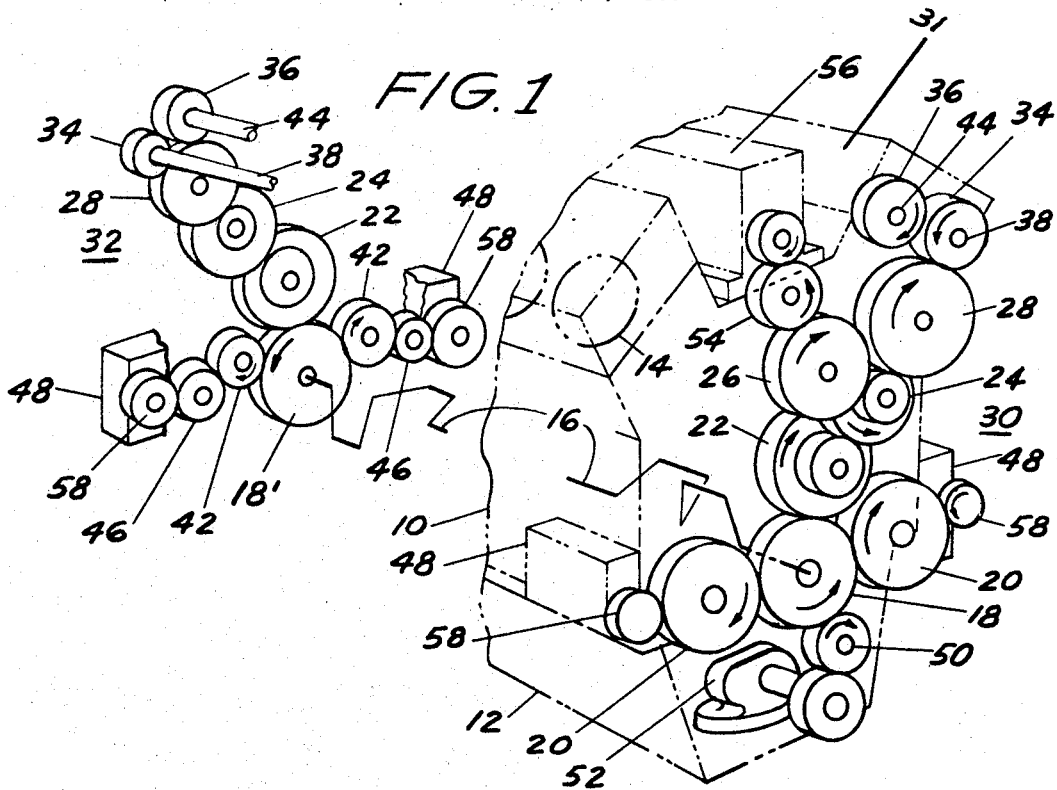
FIG. 1 illustrates the gear train and power-take-off assembly according to the invention.

Referring now to the drawing, a partial view of engine block is shown at 10 with an oil pan 12 attached thereunder and cylinders 14 (shown in phantom) bored therein. As will be more fully explained hereinafter, the instant invention is interchangeable among several V-series engines. A crankshaft, indicated at 16, is journaled in block 10 in any suitable manner as is well known in the art. A semi-barrel crankshaft is utilized which is entirely symmetrical including its ends which are designed to receive crankshaft gears 18 and 18′. Crankshaft gears 18 and 18′ are located on opposite ends of the crankshaft and may consist of a flange which has a gear formed integrally therewith about its outer periphery and which may be bolted on to each end of the crankshaft. A gear train, shown generally at 30, is mounted on the near end of the engine in driving relation with crankshaft gear 18. A similar gear train, shown generally at 32, is mounted on the far end of the engine in driving relation with crankshaft gear 18′. Inlet camshafts 44 and exhaust camshafts 38 are located in the camshafts housing 31 of the engine with drive gears 36 and 34 respectively connected thereto. In order to provide power to camshafts 38 and 44, idler gears 22, 24, and 28 are provided in driving relation with driveshaft gears 18 and 18′. Idler gears 28 on each end of the engine drive respective exhaust camshaft gears 34 which in turn drives inlet camshaft gears 36. This arrangement eliminates the necessity of a bulky, expensive and cumbersome drive chain which has been employed in the past.

Attached to either side of crankshaft gear 18 is power-take-off gears 20. Cover plates may be mounted on the engine block accessory pads when the power-take-off is not required. The drawing illustrates accessories 48 installed on either side of the engine block with drive gears 58 engaging power-take-off gears 20.

Gear train 32 which is mounted on the far end of the engine differs from gear train 30 in that power-take-off gears 20 are replaced by two smaller gears 42 and 46. This is necessary in order for the direction of rotation of the power-take-off gears 46 and 20 be the same. As can be seen from the drawing crankshaft gear 18' is drivingly engaged wtih gears 42 which are located on opposite sides of gear 18'. Gears 42, in turn, are drivingly connected to output power-take-off gears 46. Schematic representations of accessories 48 are shown mounted on either side of the engine with drive gears 58 engaged with power-take-off gears 46.

Gear train 30 also differs from gear train 32 in that fuel pump and governor mechanism 56 and oil pump 52 are driven by gear train 30. As shown in the drawing, gear 22 of the gear train 30 drives idler gears 24, 26 and 54 which latter gear is drivingly connected to the gear drive of the fuel pump and governor mechanism 56. Oil pump 52 is located in oil pan 12 and is driven by crankshaft gear 18 through idler gear 50.

The above described arrangement of the gear train results in the novel arrangement wherein power-take-off gears are evenly distributed on each corner of the engine and which all turn any given accessory at the same speed and in the same direction. Another benefit of this particular gearing arrangement is that gear trains 30 and 32 can be used on any V engine and gear train 30 or 32 can be used on any in-line engine of the of the same bore and stroke. Slight modifications are necessary to the basic front gear train to furnish balance gears in the V-8 engine and balance shafts in the 4 cylinder engine.

To eliminate noise in the gear train, idler gears 20, 22, 24, 26, 28 and 54 are all mounted with cage and roller bearings. Gears 42 and 46 on the far end 32 are similarly mounted. The use of cage and roller bearings tends to reduce the backlash between the gears, the bearings, and the shafts, to zero or near zero. This has a pronounced advantage of reducing the amount of backlash between the mating gears and reduces the gear noise. In addition, cage and roller bearings do not require positive lubrication which eliminates many oil passages. This results in a stronger cylinder block assembly and one which can be manufactured quickly and at a much lower expense because oil passages and their corresponding bosses need not be drilled or otherwise formed. In the instant invention, the needle bearings in the idler gears are merely lubricated by splash or oil running off the gears.

Figure 2:
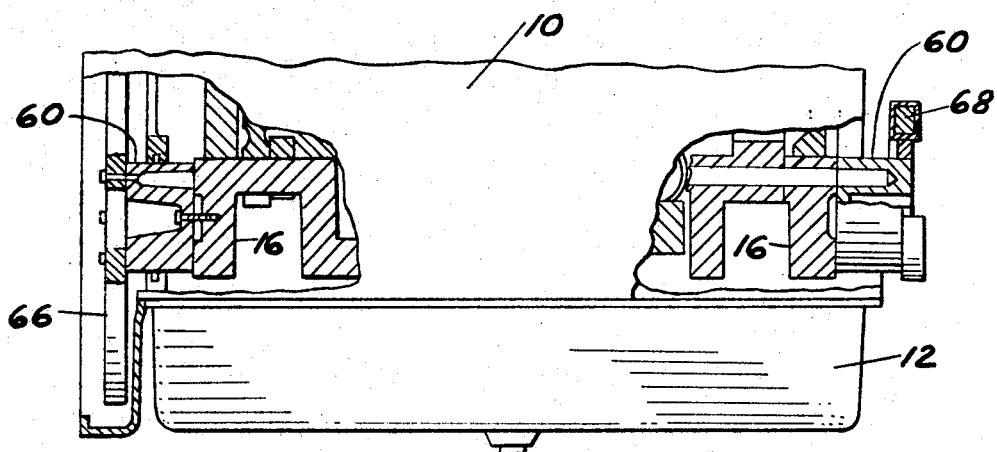
FIG. 2 is a side view of the crankshaft mounted in the engine block, parts broken away in section.

As can be seen in FIG. 2, crankshaft 16 has an adapter 60 mounted on each end. Flywheel 66 is shown as being bolted to one of the adapters 60. Mounted on the other adapter 60 is a damper 68. As can be seen in the drawing, flywheel 66 and damper 68 may be easily interchanged. In operation, this interchangeability features can be utilized to provide a rotational driving force in an opposite direction for a load which is attached to the engine. This interchangeability feature is made possible because of the complete symmetry of the block, crankshaft, and gear train. By disconnecting the load, interchanging the flywheel and damper, turning the engine end for end, and then reconnecting the load, the load can be made to rotate in the opposite direction. Opposite directional forces are often required to drive twin-screws on ships. By utilizing the present invention, only one stock engine need be manufactured for either screw. This has the additional advantage of saving the number of different spare parts required for an operational system.

We claim:
1. A timing gear assembly for an internal combustion engine comprising:
   first and second gear trains mounted on opposite ends of said engine,
   said first and second gear trains each having a series of interconnected gears,
   a first portion of said interconnected gears being idler gears utilized to transmit power within each of said gear trains,
   said first gear train having power-take-off gear means mounted so as to drivingly engage accessories which are mounted on opposite sides of the engine,
   said second gear train having power-take-off gear means mounted so as to drivingly engage accessories which are mounted on opposite sides of the engine.
2. The gear train assembly according to claim 1 wherein said idler gears are journaled on cage and roller bearings to reduce the backlash between said gears.
3. The gear train assembly according to claim 1 wherein said power-take-off gear means all rotate in a direction to cause any accessory to rotate in the same direction regardless of the power-take-off gear said accessory is connected to.
4. The gear train assembly according to claim 1 wherein said power-take-off gear means are evenly distributed at each corner of said engine and all of said power-take-off gears rotate in a direction necessary for any given accessory to rotate in the same direction and speed regardless of which power-take-off means said accessories are mounted to.
5. The gear train assembly according to claim 1 wherein said first gear train has a first crankshaft gear and first and second power-take-off gears directly connected to and in driving engagement with said first crankshaft gear, said first and second power-take-off gears being mounted on opposite sides of said crankshaft gear.
6. The gear train assembly according to claim 1 wherein said second gear train assembly has a second crankshaft gear, first and second power-take-off gears mounted on opposite sides of said crankshaft gear on opposite sides of said engine, and first and second idler gears mounted intermediate said second crankshaft gear and said first and second power-take-off gears so that the power-take-off gears of said first and second gear trains all turn a direction so as to cause accessories to rotate in the same direction regardless of which power-take-off gear drives said accessories.
7. The gear train assembly according to claim 6 wherein said first gear train has a first crankshaft gear and first and second power-take-off gears mounted on either side of and in direct driving engagement with said first crankshaft gear.
8. The gear train assembly according to claim 7 wherein said idler gears are journaled on cage and roller bearings to reduce the backlash between the gears.
9. A timing gear train assembly for an internal combustion engine having a crankshaft mounted therein comprising:
   first and second gear trains having idler gears which transmit power within said gear trains and
   power-take-off gears which transmit power to accessories mounted on said engine,
   said idler gears being journaled on cage and roller bearings,
   said first gear train being mounted on a first end of said engine and comprising,
      a first crankshaft gear which is drivingly connected to a first end of the engine crankshaft,
      first and second power-take-off gears drivingly engaged with said first crankshaft gear and mounted so as to engage accessories which are mounted on opposite sides of said engine,
   said second gear train being mounted on the second end of said engine and comprising:
      a second crankshaft gear drivingly connected to the second end of said crankshaft,
      third and fourth power-take-off gears being mounted so as to drive accessories mounted on opposite sides of said engine,
      a first idler gear mounted intermediate said second crankshaft gear and said third power-take-off gear, and
      a second idler gear mounted intermediate said second crankshaft gear and said fourth power-take-off gear so that the power-take-off gears are evenly distributed about the engine and ac- cessories will be driven in the same direction regardless of by which power-take-off gear they are driven.

References Cited

UNITED STATES PATENTS 1,556,859 10/1925 L'Orange.
2,172,100 9/1939 Hoffman et al.
2,363,804 11/1944 Reiland.
3,161,182 12/1964 Albinson et al. _____ 123—32

LEONARD H. GERIN *Primary Examiner.*

U.S. Cl. X.R.

74—15.63, 664; 123—192, 195